June 2, 1970 C. A. ALLDRED, JR., ETAL 3,514,808

APPARATUS FOR DISCONNECTING THE COMPONENTS
OF COMPOSITE FOOD PIECES

Filed Oct. 31, 1967 2 Sheets-Sheet 1

INVENTORS
CYRUS A. ALLDRED, JR.
LUCAS J. CONRAD
BY John F. Clelland Jr.
ATTORNEY June 2, 1970 C. A. ALLDRED, JR., ET AL 3,514,808

APPARATUS FOR DISCONNECTING THE COMPONENTS OF COMPOSITE FOOD PIECES

Filed Oct. 31, 1967 2 Sheets-Sheet 2

INVENTORS
CYRUS A. ALLDRED, JR.
LUCAS J. CONRAD

BY John F. [signature]

ATTORNEY

United States Patent Office 3,514,808

Patented June 2, 1970

1

3,514,808

APPARATUS FOR DISCONNECTING THE COMPONENTS OF COMPOSITE FOOD PIECES

Cyrus A. Alldred, Jr., and Lucas J. Conrad, Winston-Salem, N.C., assignors to R. J. Reynolds Tobacco Company, Winston-Salem, N.C., a corporation of New Jersey Continuation-in-part of application Ser. No. 603,484, Dec. 21, 1966. This application Oct. 31, 1967, Ser. No. 679,326

Int. Cl. A22c *17/00*

U.S. Cl. 17—1 8 Claims

ABSTRACT OF THE DISCLOSURE

Composite food pieces, for example, meat clinging to bone and the like, are fed into the center of a rotating disk. The disk is provided with a plurality of radial ribs and a tine array, in the form of a series of spirals, is mounted above the disk so that the downwardly depending tines have their tips spaced slightly above the ribs. The composite pieces, such as bony pieces of poultry carcasses, are driven centrifugally to the perihphery of the disk and are there discharged. During their passage between the tines and ribs of the disk, the composite pieces are pulled apart so that the material discharged is a conglomerate or mixture of disunited fleshy portions and hard portions. The tine array, because of the spiral arrangement, acts to cause the pieces to work back in opposition to centrifugal force produced by the rotation of the disk. The tines themselves are made of stainless steel and typically are epoxy-mounted.

BACKGROUND, OBJECTS AND SUMMARY OF THE INVENTION

In the preparation of food, and especially in the preparation of chicken meat and the like which is to be canned or frozen, it is extremely desirable to be able to separate composite food pieces, particularly the bony pieces of chicken, into components of different characteristics.

In order to accomplish the desired separation, the usual procedure is to treat the composite pieces to disunite or disconnect the components of different characteristics, thereby producing a conglomerate or heterogeneous mixture. It is consequently necessary, thereafter, to sort or classify the different components and more especially to separate meat from bones.

The present invention relates to an improvement in the apparatus and method for accomplishing the initial disconnection. The present invention constitutes an improvement upon the apparatus disclosed in copending application Ser. No. 603,484, the present application being a continuation-in-part of that copending application.

Both the present invention and the invention disclosed in the aforenoted copending application have for their fundamental purpose the overcoming of the defects in the prior art techniques of disconnecting composite pieces of food. It has been common to subject these composite pieces of food to excessive cooking and/or impact techniques. Excessive cooking results in significant loss of flavor while impact techniques produce deleterious effects on the food since there is a tendency to crush the fleshy parts and also to shatter the hard parts, such as the bones, with the resulting possibility that some of the shattered bone fragments may end up in the final food products.

Accordingly, it is a fundamental object of the present invention to enable in a most efficient manner the gentle disuniting or disconnection of different components of

2 composite food pieces and, more especially, to the disuniting of meat from the bone of poultry pieces.

Another object is to make extremely simple the disassembly and reassembly of parts in cleaning operations.

Another object is to provide for long life for the parts of the apparatus and, particularly, for the tines that are used to tear apart the food pieces.

Another specific object is to make the tine arrays capable of handling tougher forms of food products, for example, of handling tougher meat.

Another object is to enable the reduction or discontinuation of a catalytic fluid in the disconnecting operation.

Briefly stated, the primary feature of the present invention resides in the particular arrangement of the tine mounts which are provided in the form of a plurality of spirals emanating from near center of a rotating disk. A more specific feature resides in the particulars of this spiral arrangement whereby the ends of each of these tine mounts is connected inwardly to an inner ring suspended above the disk and outwardly to an outer ring likewise suspended.

Another specific feature of the invention resides in the particular mounting of the tines in an individual tine mount. The tines themselves are generally cylindrical in form and are made of stainless steel. Each tine is mounted so that it lies in a vertical plane which is perpendicular to a vertical radial plane of the rotating disk. In addition, each tine is bent at an angle of approximately 20° from said vertical radial plane. Of course, this angle is adjustable in accordance with the type of product being handled.

The basic functioning of the apparatus of the present invention is similar to that already described in the copending application Ser. No. 603,484. That is to say, the food pieces are placed on the rotating disk which has upwardly projecting ribs and the food pieces are moved, chiefly by centrifugal force, along the disk between the ribs and the arrays of flexible tines, which, as noted before, are spaced slightly above the ribs. The ribs and the tines cooperate to separate the moving food pieces into their components by steady gentle forces rather than by sharp impacts. The tines are effectively arranged in a series of spirals, the spirals beginning near the center of the disk and terminating near the periphery thereof. In the disclosed embodiment there are nine separate tine mounts each having its one end connected to an inner ring concentric with the axis of the disk and connected at its outer end to an outer ring likewise concentric with the disk axis.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
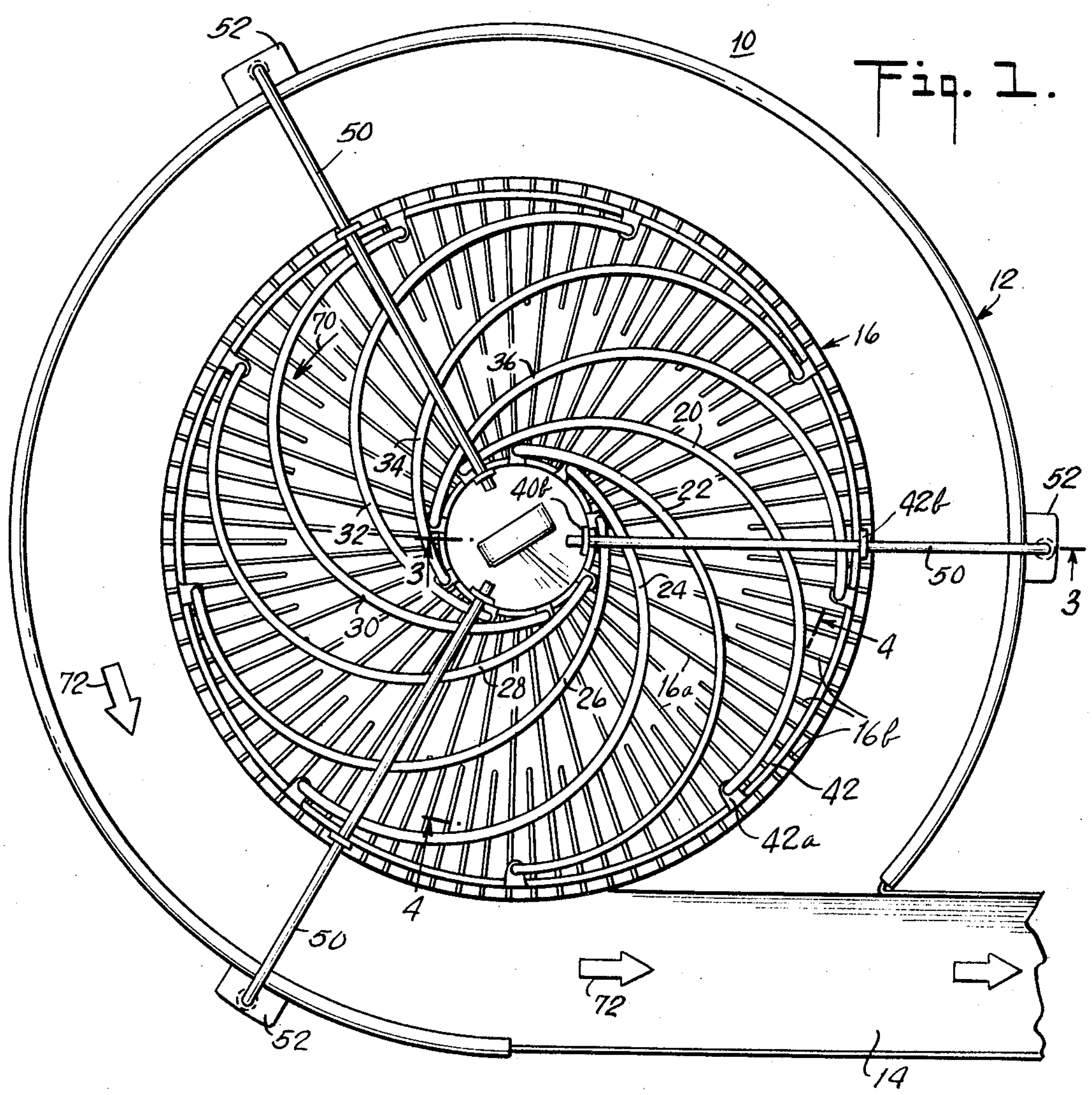
FIG. 1 is a plan view illustrating one embodiment of food disconnecting apparatus according to the present invention.

The apparatus 10, illustrated in FIG. 1, is generally cylindrical in form and is suitably supported by a frame, not shown. The apparatus 10 comprises a helical discharge channel 12 which communicates at its lower end with a discharge chute 14. Rotatably supported above the inner flange 12*a* of the channel 12 is a disk 16 having formed in its upper surface two arrays 16*a* and 16*b* of radially extending ribs. The array 16*a* extends from a point near the center of the disk to its periphery while the ribs 16*b* are considerably shorter and extend from a point approximately opposite the middle of the rib 16*a* to the periphery of the disk. The center of the disk is attached as by welding to an upwardly projecting streamline cone 18 having a handle 18*a* formed on its top.

Figure 2:
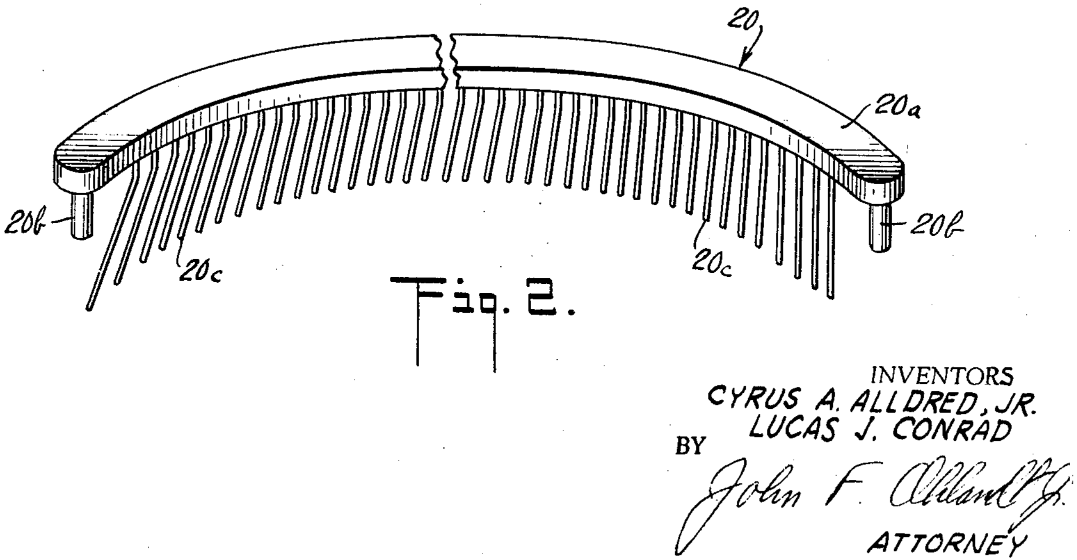
FIG. 2 is a perspective view of a portion of the apparatus; more particularly, illustrating one of the tine mounts.

Supported above the disk 16 by means to be described hereinafter, are the tine mounts which, in this illustration, are nine in number and are designated 20 through 36. One of the tine mounts is shown in perspective in FIG. 2. Typical tine mount 20 so illustrated comprises a bar 20*a*, in the form of a semi-circle and having an integral lug 20*b* at each of its ends for mounting purposes. Depending from the mount bar 20*a* is a series of spaced tines 20*c* whose tips, as noted before, are suspended immediately above the radial ribs 16*a* and 16*b* formed in the disk 16.

Figure 6:
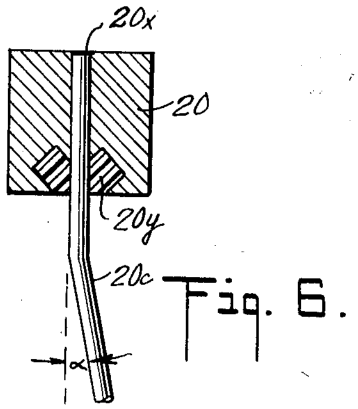
FIG. 6 is a sectional view through the tine mount showing the mounting of a typical tine.

The tines 20*c*, and likewise all of the tines in the other tine mounts 22 through 36, are cylindrical in form and are preferably made of stainless steel spring stock. This material is especially strong and is resistant to corrosion and contamination and is thus ideally suited for the purposes in accord with the present invention. The typical tines 20*c* are affixed in receiving bores within the tine mount and are preferably welded, such as by inert gas welding processes, to form the welds 20 at the top of the mount (FIG. 6). Also, as a means for sealing the individual tines to the bar 20*a*, so as to eliminate any crevices which might serve as germ sites, recesses are provided on the lower end of the receiving bores for the tines. These recesses are filled with a plastic material 20*y*, such as an epoxy resin.

Figure 4:
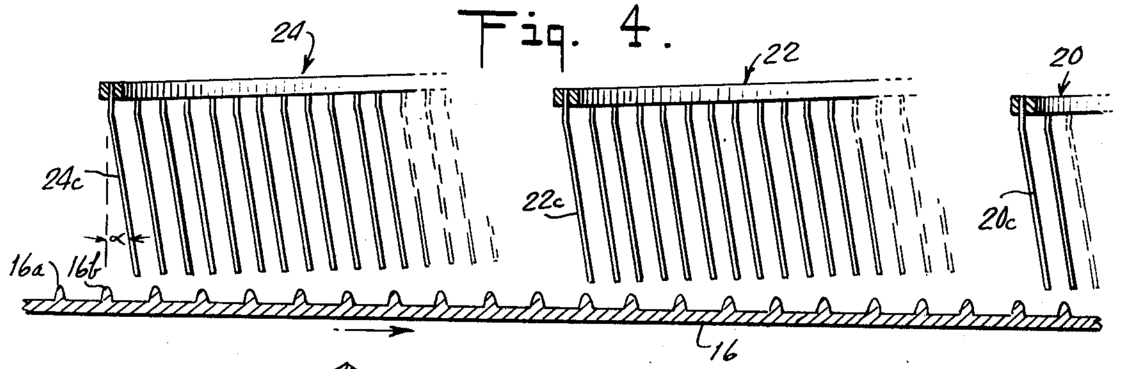
FIG. 4 is a vertical sectional view taken on the line 4—4 in FIG. 1.
Figure 5:
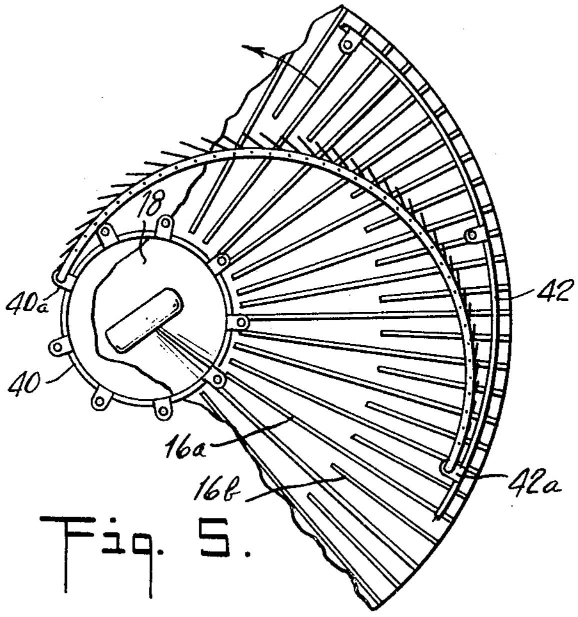
FIG. 5 is a fragmentary plan view illustrating the details of construction of the tine mounts and their connection to the tine support rings.

For use in the processing of chicken wings and the like it has been found suitable to use tines which are 12 inches long, ⅛ inch in diameter, and spaced apart ¼ inch. As best seen in FIGS. 4, 5 and 6, the individual tines lie in a vertical plane which is perpendicular to a vertical radial plane of the disk 16. Also, they are at an angle alpha from this vertical radial plane, that is, they are inclined at this angle from a plane perpendicular to a radius of the disk.

Each of the tine mounts extends from and is supported at one end by the inner ring 40. At its other end, each tine mount is supported by the outer ring 42. For example, referring to the tine mount 20 shown in FIG. 2, the lug 20*b* at the one end of the bar 20*a* fits into a receiving hole in a bracket 40*a* on the inner ring 40. The other lug 20*b* fits into a receiving bracket 42*a* on the outer ring 42. The entire assembly, i.e. the assembly of the tine mounts connected to the inner and outer rings 40 and 42, is supported by means of the plurality of supporting arms 50 which are spaced around the periphery of the ring. Each of the arms 50 has its outer end bent downwardly and rotatably supported in the plates 52. Each arm extends radially inwardly to support the tine assembly and is received in appropriate slots in the lugs 40*b* and 42*b*, attached to the inner and outer rings 40 and 42, respectively. Suitable means such as a collar 54 in set screw 56 are provided for adjusting the vertical position of the arms 50, thereby providing for vertical adjustment of the tines.

In order to allow for a difference in the tine-rib spacing between the center of the disk and the periphery thereof for purposes to be explained, means are provided for adjusting the elevation of one of the rings 40 or 42. Thus, in the illustrated embodiment (see especially FIG. 3), the elevation of the inner ring 40 is varied by means of a pin and receiving hole arrangement 40*c*. Consequently, the tine-rib spacing near the center of the disk can be made larger or smaller, and this adjustment will be made depending on the circumstances; that is, upon the variations and food pieces being processed. Typically a very small tine-rib spacing of the order of ¼ inch is provided at the periphery of the disk, whereas, near the center of the disk, the tine-rib spacing is adjusted by the means described above to be of the order of 1¼ inches.

Figure 3:
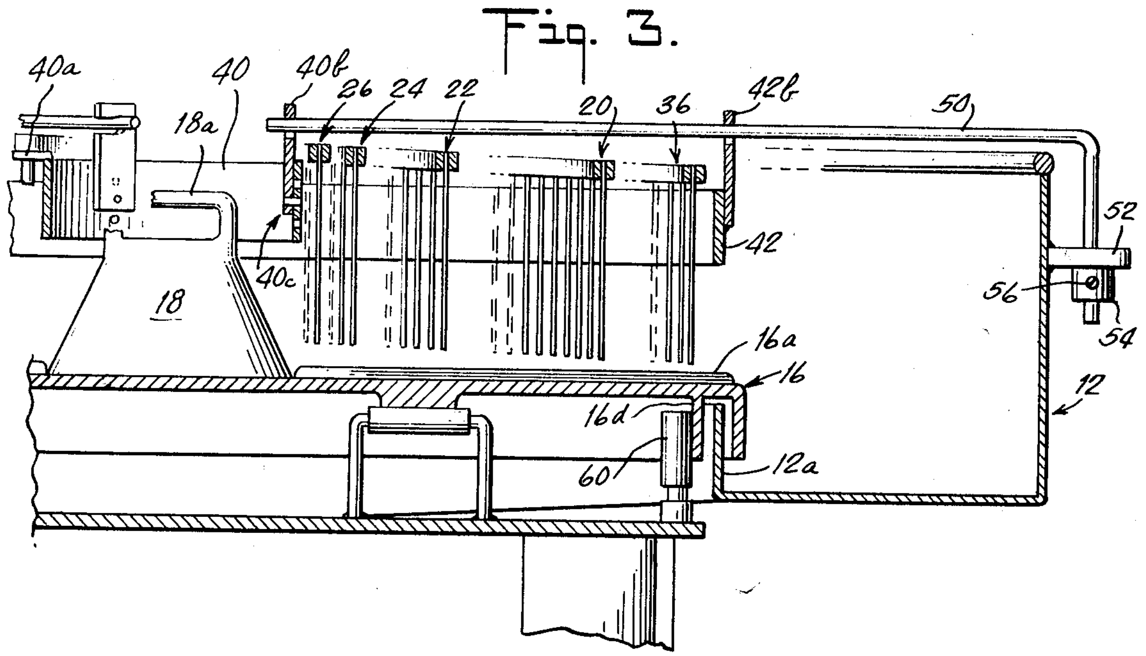
FIG. 3 is a vertical sectional view taken on the line 3—3 in FIG. 1.

The disk 16 is driven in a manner already described in copending application Ser. No. 603,484, which may be referred to for details. In short, the disk 16 is flange-driven, that is to say, the inner flange 16*d* is driven by the rollers 60, one of which is shown in FIG. 3. The roller 60, is, of course, connected to a suitable motor means not illustrated.

OPERATION

The food pieces to be separated which, as a typical example, might be slightly cooked chicken wings, are supplied to the upper center of the disk 16 by any suitable delivery mechanism. It is preferable that a suitable fluid such as water, brine and the like be supplied at or near the center of the disk. However, tests have indicated that a fluid may not be necessary. The spacing between the tips of the tines, such as the tines 20*c*, and the ribs 16*a* and 16*b* may be adjusted by means of the set screws 56. Thus, the arms 50 may be raised or lowered in varying the tine-rib spacing to accommodate the differing forms of food pieces; also, the adjustment in the elevation of the inner ring 40 may be made, as already described, to provide the desired difference in the tine-rib spacing between center and periphery of the disk.

In operation, the disk 16 is rotated in a counterclockwise direction as shown by the arrow 70 in FIG. 1. As the disk turns, centrifugal forces tend to move the food pieces outwardly under the tines. As the pieces pass the tines the fleshy parts of the food pieces are engaged by the tines and are stripped from the bones. The ribs 16*a* and 16*b* define outwardly expanding channels through which the separated components may pass. Some of the food pieces, of course, tend to be carried around the axis of the disk 16 but these pieces work back in opposition to the centrifugal force as they are constantly being urged inwardly against successive tines in the spiral arrangement. It will, therefore, be appreciated that the feature of providing a difference in the tine-rib spacing between the center of the disk and its periphery is nicely calculated to permit differing sizes of food pieces to work their way until they find the spacing that will accommodate them. In other words, because of the progressively greater spacing toward the center, as those pieces, which are too large with respect to the peripheral tine-rib spring, move inwardly, they will eventually encounter just that spacing between the tines and the ribs as will enable their fleshy parts to be removed.

Thus, it will be apparent that the spiral arrangement for the tines accomplishes the required separating objectives but does so with an extremely simple configuration.

As mentioned before, it is not necessary that any fluid be used in the separation procedure. If a fluid is used it should be chosen in accordance with the characteristics of the food particles being treated. It is preferable that only a slight velocity head for the fluid be employed.

The product discharged at the periphery of the disk 10 is a conglomerate mass of meat, skin and bones. The meat has been separated from the bones so that the meat no longer clings thereto. The mixture passes down through the helical discharge channel 12 in the direction of the arrow 72 and out through the chute 14. A fluid can likewise be employed at this point, if desired, to assist in the discharge of the mixture. While the helical discharge channel 12 is found to be a suitable arrangement for receiving the output from the periphery of the disk 16, other equivalent arrangements may be employed. It is only necessary that such mechanisms be capable of receiving the mixture as it passes from the periphery of the disuniter.

The mixture delivered from the apparatus may be segregated into its component parts by techniques well-known in the art. Particularly in the field of greatest applicability, that is, the case of separating meat from bones, such later separation may be accomplished whereby the bones may be discarded by, for example, the floating method well-known in the art. Alternatively, a unique method, described in copending application Ser. No. 679,498, filed Oct. 31, 1967, and assigned to the assignee of the present application may be employed.

CLEANING

When it is desired to clean the apparatus 10, the arms 50 are disengaged from their receiving slots on the support rings 40 and 42 and the tine mount assembly, that is, the plurality of tine mounts 20 through 36, along with the support rings, is bodily removed. In turn the separate tine mounts are simply removed from their support rings. The disk 16 is lifted by means of handle 18*a*, after which the helical discharge channel is lifted out for cleaning. It will thus be seen that the entire apparatus may be quickly and rapidly taken apart without the need for any special tools, and the individual parts may be thoroughly cleaned to prevent any possible contamination. It also will be understood from the arrangement of parts already described that a minimum number of separable parts have been provided for the desired functions.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for disconnecting the components of composite food pieces comprising:

(a) means defining a path of movement for said food pieces, said means including a disk rotatable about the vertical axis and having an array of upwardly projecting, substantially radially extending ribs thereon, (b) a series of tine mounts extending from a point near the center of the disk to a point near the periphery thereof, to form spirals part way around the axis of said disk, said tine mounts comprising mount bars with tines secured therein, and suspended so as to have the tines projecting downwardly to leave spaces between the tips of the tines and the ribs on the disk, (c) means for moving said food pieces along said path and between said tines and said disk, (d) said tine mounts being suspended so as to be inclined slightly from the horizontal, whereby the tine-rib spacing near the center of said disk is greater than the spacing at the periphery of said disk.

2. Apparatus for disconnecting the components of composite food pieces comprising:

(a) means defining a path of movement for said food pieces, said means including a disk rotatable about a vertical axis and having an array of upwardly projecting substantially radially extending ribs thereon, (b) inner and outer rings; a series of tine mounts extending from the inner to the outer ring to form spirals part way around the axis of said disk, said tine mounts comprising mount bars with tines secured therein, and being supported by said rings so as to have the tines projecting downwardly to leave spaces between the tips of the tines and the ribs on the disk, (c) means for moving said food pieces along said path and between said tines and said disk, (d) said inner and outer rings being at different elevations and the tine mounts are being supported thereby as to be inclined slightly from the horizontal, whereby the tine-rib spacing near the center of said disk is greater than the spacing at the periphery of said disk.

3. Apparatus as defined in claim 2, in which said array of ribs extends from a locality near the center of said disk to a locality near the periphery thereof.

4. Apparatus as defined in claim 2, in which said moving means includes means for rotating the disk;

means at the periphery of said disk for receiving disconnected parts of said food pieces which pass between the tines and the disk.

5. Apparatus as defined in claim 2, in which the tines are cylindrical and composed of stainless steel.

6. Apparatus as defined in claim 5, in which each of said tines is mounted in an epoxy-filled recess in a mount bar.

7. Apparatus as defined in claim 6, in which each of said tines lies in a plane perpendicular to a vertical radial plane of the disk and is bent at an angle from said vertical radial plane.

8. Apparatus as defined in claim 7, in which said angle is approximately 20°.

References Cited

UNITED STATES PATENTS

| | | | |
|---|---|---|---|
| 2,747,632 | 5/1956 | Barton | 146—8 |
| 3,142,860 | 8/1964 | Churchill | 17—1 |
| 3,256,555 | 6/1966 | Paoli | 17—1 |

W. GRAYDON ABERCROMBIE, Primary Examiner

U.S. Cl. X.R.

17—46; 146—76